(12) United States Patent
Christ et al.

(10) Patent No.: US 11,519,929 B2
(45) Date of Patent: Dec. 6, 2022

(54) DEVICE FOR POSITIONING A WHEEL SPEED SENSOR, ABS SYSTEM COMPRISING A DEVICE FOR POSITIONING A WHEEL SPEED SENSOR, AND METHOD FOR ADJUSTING A WHEEL SPEED SENSOR

(71) Applicant: SAF-HOLLAND GmbH, Bessenbach (DE)

(72) Inventors: Armin Christ, Bessenbach (DE); Kerstin Kreiner, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 482 days.

(21) Appl. No.: 16/484,742

(22) PCT Filed: Feb. 20, 2018

(86) PCT No.: PCT/EP2018/054169
§ 371 (c)(1),
(2) Date: Aug. 8, 2019

(87) PCT Pub. No.: WO2018/153867
PCT Pub. Date: Aug. 30, 2018

(65) Prior Publication Data
US 2021/0116472 A1    Apr. 22, 2021

(30) Foreign Application Priority Data
Feb. 27, 2017   (DE) ..................... 10 2017 103 979.1

(51) Int. Cl.
*G01P 3/44*     (2006.01)
*B60T 17/22*    (2006.01)
*G01P 1/00*     (2006.01)

(52) U.S. Cl.
CPC ............... *G01P 3/44* (2013.01); *B60T 17/22* (2013.01); *G01P 1/00* (2013.01)

(58) Field of Classification Search
CPC ........................................................ G01P 3/44
(Continued)

(56) References Cited

U.S. PATENT DOCUMENTS 5,325,734 A * 7/1994 Jordan ..................... G01P 1/00
                                                  73/866.5
6,062,529 A   5/2000 Stevenson et al.
(Continued)

FOREIGN PATENT DOCUMENTS

CN    102472767 A    5/2012
CN    104417444 A    3/2015
(Continued)

OTHER PUBLICATIONS

European Patent Office; International Search Report; dated Jun. 1, 2018.

*Primary Examiner* — Walter L Lindsay, Jr.
*Assistant Examiner* — Philipmarcus T Fadul
(74) *Attorney, Agent, or Firm* — Price Heneveld LLP

(57) ABSTRACT

The present invention proposes a device for positioning a wheel speed sensor relative to a pole wheel, comprising a fastening mechanism for attaching the device to an axle body part, a receiving region for receiving the wheel speed sensor, and a positioning mechanism for the controlled setting of a distance between the receiving region and the pole wheel.

10 Claims, 2 Drawing Sheets

(58) Field of Classification Search
USPC .......................................................... 324/179
See application file for complete search history.

(56) References Cited

U.S. PATENT DOCUMENTS

2003/0093188 A1* 5/2003 Morita ................ B60C 23/0408
701/1
2007/0157742 A1* 7/2007 Kouduki ................. B60B 27/00
73/862.541

FOREIGN PATENT DOCUMENTS

| | | |
|---|---|---|
| DE | 2928610 A1 | 2/1981 |
| DE | 1033064 A1 | 4/1992 |
| DE | 4231332 C2 | 10/2002 |
| DE | 102007056340 | 5/2009 |
| EP | 2243673 A1 | 10/2010 |
| EP | 2583873 A2 | 4/2013 |

* cited by examiner

DEVICE FOR POSITIONING A WHEEL SPEED SENSOR, ABS SYSTEM COMPRISING A DEVICE FOR POSITIONING A WHEEL SPEED SENSOR, AND METHOD FOR ADJUSTING A WHEEL SPEED SENSOR

BACKGROUND OF THE INVENTION

The present invention relates to a device for positioning a wheel speed sensor, to an ABS system comprising a device for positioning a wheel speed sensor and to a method for adjusting a wheel speed sensor.

ABS systems are well known from the prior art and can be found, for example, on wheel bearing suspensions in which a nonrotating axle body part and a further axle body part, which can be rotated with respect to the axle body part about an axis of rotation, for rotatably mounting a wheel, in particular a vehicle wheel, are provided. The essential constituent parts of the ABS system are a wheel speed sensor and a pole wheel, by means of which sensor and pole wheel a current wheel speed can be detected or determined. Here, the pole wheel is attached to the rotating further axle body part and comprises on its outer circumference a structuring, preferably a toothing, which is guided past the positionally fixed wheel speed sensor in the case of a rotation of the further axle body part. Here, the wheel speed sensor arranged in a positionally fixed manner is preferably configured in such a way that it detects the change between toothing and empty region between two toothings, for example on the basis of a change in a magnetic field if the toothing is guided past the wheel speed sensor in the case of the rotating further axle body part.

It is an object of the present invention to provide a device by means of which a highest possible signal strength for the measurement variable detected by the wheel speed sensor can be ensured in a permanent manner and in as simple a manner as possible.

SUMMARY OF THE INVENTION

According to the invention there is provided a device for positioning a wheel speed sensor relative to a pole wheel, comprising a fastening mechanism for attaching the device to an axle body part, a receiving region for receiving the wheel speed sensor, and a positioning mechanism for the controlled setting of a distance between the receiving region and the pole wheel. It proves to be advantageous here by comparison with the prior art that the distance between the pole wheel and the wheel speed sensor can be set in a controlled manner by means of the positioning mechanism. Here, not only is the as accurate as possible setting of the distance advantageous, but the positioning device also simplifies handling when setting the optimum distance. In particular, it is possible to dispense with a manual orientation of the wheel speed sensor with respect to the receiving region. Specifically, instead of the manual orientation of the wheel speed sensor with respect to the receiving region, the device according to the invention allows a displacement of the receiving region and thus of the wheel speed sensor by actuation of the positioning mechanism. Here, the distance between the receiving region and the fastening mechanism and thus the distance between the pole wheel and the wheel speed sensor can be changed or adjusted by the positioning mechanism. There is preferably provision that the axle body part is a part of a vehicle axle, in particular of a commercial vehicle. Here, the axle body part to which the fastening mechanism is attached in the mounted state is in particular positionally fixed and nonrotating, whereas a further axle body part is mounted with respect to the positionally fixed and nonrotating axle body part so as to be rotatable about an axis of rotation. There is further provision that the pole wheel is connected to the rotatable axle body part in a rotationally fixed manner and has on its outer circumference a structuring, in particular a toothing. In particular, the positioning mechanism is configured in such a way that it allows a controlled setting of the distance between the wheel speed sensor and the structuring. Furthermore, a person skilled in the art will understand by a controlled setting of a distance that an offset of the receiving region between 10 μm and 500 μm, preferably between 10 μm and 100 μm and preferably between 10 μm and 50 μm, can be realized by an individual predefined actuating operation of the positioning mechanism, for example a 45° rotation of a screw or nut. It is conceivable here that the positioning mechanism is a micrometer screw or a part of a micrometer screw. Since, for an optimum signal strength or signal quality, it has proved advantageous to set a distance between the pole wheel and the wheel speed sensor of substantially 0.7 mm, the optimum value for the distance can be realized with the above-described offset variables. Furthermore, it is conceivable for the receiving region to be configured as a set-back contour into which the wheel speed sensor is inserted or embedded and can be fixed in a form-fitting or force-fitting manner, for example by clipping or screwing. Alternatively, it is also conceivable for the receiving region to have a receiving surface to which the wheel speed sensor can be attached in an integrally bonded manner, for example by welding or adhesive bonding.

The device is preferably designed in such a way that the predefined actuating operation is accompanied by a signal. For example, a corresponding signal, in particular an acoustic or haptic signal, is emitted if the predefined actuating operation is concluded. It would be conceivable, for example, for the rotary movement to be coupled with a latching-in movement, in particular coupled in such a way that the positioning mechanism latches in after the predefined actuating operation. In particular, the offset and the fixing can be realized with the same predefined actuating operation. In particular, the fixing of the positioning mechanism can be realized without a clamping screw which otherwise is pressed in the fastened state against the positioning mechanism or the receiving region for fixing thereof. Such clamping screws are usually oriented in such a way that their longitudinal axis extends perpendicularly or obliquely to the direction of offset along which the positioning mechanism is displaced, and the positioning mechanism is clamped as a result of the displacement of the clamping screw along its longitudinal axis. Correspondingly, the use of the clamping screw requires two movements for displacement and fixing, namely one movement along the direction of offset and one movement along the longitudinal axis of the clamping screw.

The device expediently comprises a scale which informs the user on the degree of the displacement. As a result, the user can advantageously estimate how large is the displacement carried out by him or her. The scale in question is preferably a movable length scale for increasing the reading accuracy on measuring devices, such as a vernier gauge, for example. Furthermore, it is conceivable for the scale to comprise further markers for rough orientation, with the result that the user arrives at the desired target region as quickly as possible. It is thereby possible for example to avoid a situation in which the user slowly approaches the optimum distance.

According to a further embodiment of the present invention, there is provision that, in particular in a mounted state, the receiving region can be displaced and in particular fixed relative to the axle body part by means of the positioning mechanism. The positioning device advantageously allows not only a displacement of the receiving region with respect to the axle body part, but the positioning mechanism also fixes the receiving region with respect to the axle body part. It can thereby be ensured that the optimum set distance between the pole wheel and the wheel speed sensor is permanently maintained. In addition, the attachment to the axle body part proves to be advantageous because the distance between the fastening of the device and the pole wheel can be kept as small as possible as a result, whereby a susceptibility of the device to take up oscillations or vibrations is reduced and finally the wheel speed sensor also remains oriented in an optimally position-fixed manner during operation.

There is expediently provision that the fastening mechanism can be or is connected via a fastening region to the axle body part in a form-fitting, force-fitting and/or integrally bonded manner. For example, the fastening mechanism is welded or screwed to the axle body part. It is thereby possible to realize a permanent and stable connection between the fastening mechanism and the axle body part. The integrally bonded attachment additionally allows an additional bore in the axle body part to be dispensed with and can particularly be used when upgrading already existing or installed wheel bearing suspensions or axle body parts. By contrast, the fastening mechanism which can be screwed on can be exchanged in a particularly simple manner. There is furthermore provision that the fastening region is adapted to an outer shape of the axle body part in order to ensure optimally flat bearing of the fastening mechanism on the axle body part and thus a stable arrangement.

There is preferably provision that the positioning mechanism connects the fastening mechanism to the receiving region. In other words, the positioning mechanism is arranged between the receiving region and the fastening mechanism. In particular, the positioning mechanism is configured in such a way that an end of the positioning mechanism can be moved in and out, with the result that the extent of the positioning mechanism can be changed in at least one direction.

In a further embodiment of the present invention, there is provision that the positioning mechanism comprises a guide region along which the receiving region is mounted and/or can be displaced translationally. In particular, there is provision that the guide region limits the movement of the receiving region to a single direction. This simplifies handling when setting the distance. It is conceivable here for the translational movement to occur along a straight line or along a curved path. For example, the guide region is a guide rail or a system composed of a plurality of guide rails.

The device is preferably designed in such a way that the receiving region can be displaced and fixed in a toolless manner. An additional tool can thus advantageously be dispensed with. In particular, there is no need for the tool to be carried along if an orientation of the wheel speed sensor is required. For example, the displacement and the fixing can be conducted by a manual actuation of the positioning mechanism using a hand or hand movement. Correspondingly, a complex sequence of movement patterns for displacing and fixing the positioning mechanism is dispensed with.

In an advantageous embodiment of the present invention, there is provision that the positioning mechanism has an interface region, in particular a fastening tab, wherein in particular the wheel speed sensor or the receiving region is arranged at a first end of the interface region, and the fastening tab has an opening at a second end. Here, the first end and the second end are preferably opposite one another, in particular in a direction extending perpendicularly to the translation direction along which the fastening tab is movable. In particular, there is provision that the interface region is shiftable or displaceable.

According to a further embodiment of the present invention, there is provision that a spindle engages through the opening at the second end of the interface region, wherein the spindle preferably comprises an external thread and/or the opening comprises an internal thread, wherein the internal thread and/or the external thread particularly have/has a pitch between 0.2 mm and 5 mm, preferably between 0.5 and 2.5 mm and particularly preferably between 0.8 and 1.5 mm. Here, the spindle not only forms a guide rail, but it additionally determines by way of its external thread how finely changes can be effected when shifting the interface region, in particular the fastening tab. Here, a pitch between 0.8 and 1.5 mm has proved to be particularly advantageous, since, on the one hand, it ensures a fine setting and, on the other hand, it provides a sufficiently large offset which allows a comparatively quick setting of the optimum distance. Here, a person skilled in the art will understand the pitch in metric threads to mean a distance which is covered by one rotation, that is to say a distance between two thread tips in mm. Here, it is also conceivable for the spindle to be provided by a threaded pin or a screw, in particular a cylindrical screw, screwed through the fastening mechanism. It is also conceivable for the spindle to be rotatably mounted. If the spindle has an external thread on the one hand and the opening has an internal thread on the other hand, the interacting threads can be used for fixing the interface region, with the result that the number of additional fixing means can be reduced in an advantageous manner. In other words, the internal thread in the opening and thus the fastening tab itself can act as a locknut.

The internal thread and/or the external thread are/is preferably coated, in particular with a plastic film. Oscillations, for example, can thus be damped, with the result that the wheel speed sensor can advantageously additionally be protected in the long term.

In a further embodiment of the present invention, there is provision that, for the controlled setting of the distance between the wheel speed sensor and the pole wheel, the interface region can be fixed with respect to the spindle by means of two fixing means, in particular two nuts. A permanent positionally fixed orientation of the wheel speed sensor can be ensured by means of the two fixing means between which the interface region is preferably arranged or clamped. What is preferably concerned is a hexagon nut whose outer contour simplifies the tightening and the loosening of the nuts. In particular, the fixing means are configured or oriented in such a way that shifting of the interface region can be initiated by turning the fixing means.

Furthermore, there is provision in a preferred embodiment that the fixing means, in particular in a fixing state, bear against the fastening tab on opposite sides. As a result, for example, the nuts can act as locknuts and permanently fix the fastening tab or the interface in an optimally position-fixed manner, wherein the fixing particularly withstands the vibrations occurring during operation of the wheel bearing suspension or of the wheel bearing.

According to a further embodiment of the present invention, there is provision that the receiving region is mounted so as to be displaceable in a translation direction extending obliquely to the axis of rotation, wherein in particular the translation direction is inclined with respect to an axis of rotation, about which the axle body wheel part with the pole wheel rotates, by 30° to 60°, preferably between 40° and 50° and particularly preferably by substantially 45°. In particular, the translation direction is predetermined by the orientation of the spindle. For example, the angle of inclination can also be influenced by a profile of a collar to which the fastening mechanism is attached. However, it is also conceivable for the orientation of the spindle to be predetermined by the shape of the fastening mechanism.

There is preferably provision that the distance between the wheel speed sensor and the pole wheel can be set in a range of potential distances between 0.2 and 3 mm, preferably 0.3 and 2.3 mm and particularly preferably between 0.5 and 1.5 mm. The predetermination of ranges can avoid a situation in which the user when seeking the optimum distance inadvertently moves too far away from the optimum value or in which the wheel speed sensor during adjustment inadvertently strikes the pole wheel. For example, the range can be realized by stops on the guide rail or the spindle.

There is expediently provision that the wheel speed sensor is displaceably mounted and can in particular be fixed relative to the receiving region along a further translation direction which preferably differs from the translation direction for displacing the receiving region. There can thus be provided a further, in particular independent, degree of freedom for the orientation of the wheel speed sensor that, together with the movement along the translation direction, allows the user a greater freedom in the displacement or positioning of the wheel speed sensor with respect to the pole wheel.

According to a further embodiment of the present invention, there is provision that, for further setting of the distance between the pole wheel and the wheel speed sensor, the fastening mechanism is pivotably arranged on the axle body part. The freedom of movement when setting the position of the wheel speed sensor can thus preferably be further increased. It is also conceivable for the positioning mechanism to be arranged pivotably on the fastening mechanism. Here, the degree of pivoting is preferably fixable, with the result that it is possible to set and fix the translation direction before a fine adjustment by means of the positioning mechanism and subsequently, with the selected translation direction, for a fine adjustment, change the distance between the pole wheel and the wheel speed sensor.

In a further advantageous embodiment of the present invention, there is provision that the fastening mechanism is attached to the further axle body part so as to be offset by a holder distance from the pole wheel in an axial direction which is predetermined by the axis of rotation of the axle body part, wherein the ratio between holder distance and the thickness of the pole wheel measured in the axial direction assumes a value between 0.75 and 5, preferably between 0.8 and 3 and particularly preferably between 0.9 and 1.8. The setting of the specified dimensions makes it possible to achieve an optimally close arrangement of the fastening mechanism that allows the takeup of oscillations to be reduced during operation of the device or the wheel bearing. The optimum distance between the wheel speed sensor and the pole wheel is consequently maintained. A dimensioning with a ratio between 0.9 and 1.8 additionally advantageously allows the device to be designed to be as small as possible and thus to be economical in terms of installation space.

A further subject of the present invention is an ABS system comprising a device for positioning a wheel speed sensor relative to a pole wheel, comprising a fastening mechanism for attaching the device to an axle body part, a receiving region for receiving the wheel speed sensor, a positioning mechanism for the controlled setting of a distance between the receiving region and the pole wheel, and an axle body part and a further axle body part which is connected to the pole wheel in a rotationally fixed manner, wherein the further axle body part is mounted so as to be rotatable with respect to the axle body part about an axis of rotation. All of the features described for the device according to the invention and the advantages thereof can likewise be applied, correspondingly, to the ABS system according to the invention, and vice versa. The ABS system preferably comprises a control or evaluation device which receives and evaluates the measurement variable of the wheel speed sensor.

A further subject of the present invention is a method for adjusting a wheel speed sensor, in particular by means of a device according to the invention, comprising the method steps of: providing an axle body part, mounting the fastening mechanism on the axle body part, mounting the wheel speed sensor on a receiving region, and setting the distance between the wheel speed sensor and a pole wheel by means of a positioning mechanism. All of the features described for the device according to the invention and the advantages thereof can likewise be applied, correspondingly, to the method according to the invention, and vice versa.

BRIEF DESCRIPTION OF THE DRAWINGS

Further advantages and features will emerge from the following description of preferred embodiments of the subject matter of the invention with reference to the appended figures. Here, individual features of the individual embodiment can be combined with one another within the scope of the invention.

In the figures.

DESCRIPTION OF THE PREFERRED EMBODIMENTS

Figure 1:
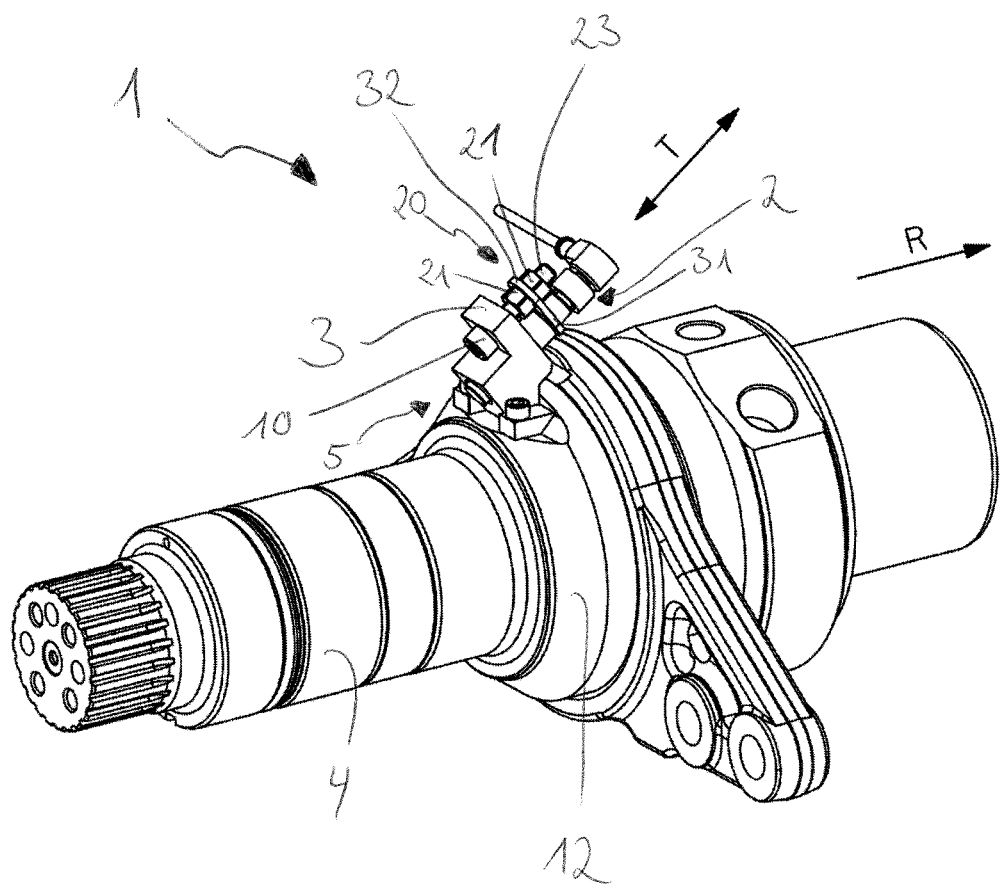
FIG. 1 shows a device for positioning a wheel speed sensor according to a first preferred embodiment of the present invention.

FIG. 1 illustrates a device 1 for positioning a wheel speed sensor 5 according to a first preferred embodiment of the present invention. Such wheel speed sensors 5 are preferably part of an ABS system and serve to determine the current speed of a vehicle wheel. In addition to an axle body part 4 and a further axle body part which can be rotated with respect to the axle body part 4 about an axis of rotation, an essential constituent part of the ABS system is a pole wheel (not shown) which is connected to the further axle body part in a rotationally fixed manner. In particular, the vehicle wheel is also attached to the further axle body part. The pole wheel preferably comprises on its circumference a structuring, for example a toothing. The wheel speed sensor 5, in particular the wheel speed sensor 5 arranged in a positionally fixed manner, then detects the change between the toothing and the empty region between the toothings, allowing a conclusion to be drawn on a current wheel speed. Here, an essential criterion for the successful functionality is the positionally accurate arrangement of the wheel speed sensor 5 with respect to the pole wheel. There is preferably provision that, for positioning a wheel speed sensor 5 relative to the pole wheel, the device 1 has a fastening mechanism 3 for fastening to the axle body 4 and a receiving region 2 for receiving the wheel speed sensor 5. In the embodiment illustrated in FIG. 1, the fastening mechanism 3 is screwed to the axle body part 4. In particular, the fastening mechanism 3 is attached to a collar 12 of the axle body part 4, in particular to a collar 12 which extends peripherally on the axle body part. For the controlled setting of the distance between the wheel speed sensor 5 and the pole wheel, there is provided a positioning mechanism 20 by means of which the receiving region 2 can be displaced, in particular shifted, with respect to the fastening mechanism 3. Here, the positioning mechanism 20 preferably comprises a fastening tab 22, at the first end 31 of which the receiving region 2 for the wheel speed sensor 5 is arranged, and at the second end 32 of which an opening is arranged. Here, a spindle 23 which projects from the fastening mechanism 3 and which has an external thread engages through the opening. It is conceivable here for the spindle 23 to be a threaded pin or a thread of a screw, which is screwed into the fastening mechanism 3, with a screw head 10. To fix the fastening tab 22, there are provided two fixing means 21 which can be arranged on mutually opposite sides of the fastening tab 22, in particular in the region of the opening. For example, the fixing means 21 are nuts, in particular hexagon screws, which can be screwed onto the thread. The fastening tab 22 is preferably arranged between the fixing means 21, and the fastening tab 22 can be clamped for fixing between the fixing means 21. The nuts can then be turned for example in order to adjust the distance of the fastening tab 22 from the fastening mechanism 3 and thus the distance between the pole wheel and the wheel speed sensor 5. Here, the fastening tab 22 can be shifted along a translation direction T which is predetermined by the orientation of the spindle and preferably extends obliquely to an axis of rotation direction R, in particular being inclined by an angle of substantially 45° with respect to the axis of rotation direction R.

Figure 2:
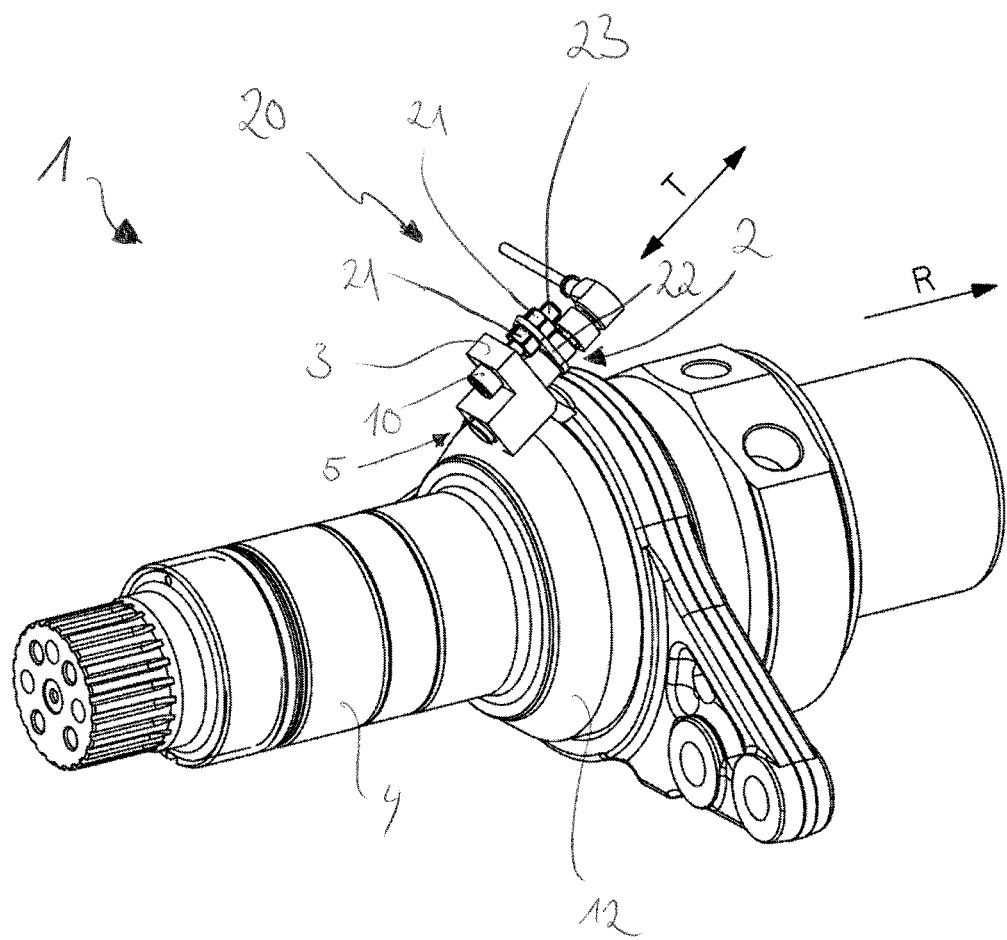
FIG. 2 shows a device for positioning a wheel speed sensor according to a second preferred embodiment of the present invention.

FIG. 2 illustrates a device 1 for positioning a wheel speed sensor 5 according to a second preferred embodiment of the present invention. Here, the device 1 differs from the device 1 from FIG. 1 only in that the fastening mechanism 3 of the second preferred embodiment is welded to the axle body part 4. In particular, the fastening mechanism 3 is welded to the collar 12 of the axle body part 4, in particular to a collar side of the axle body part 4 that extends obliquely to the axis of rotation direction R.

The invention claimed is:

1. A device for positioning a wheel speed sensor relative to a pole wheel, comprising:
   a fastening mechanism configured to attach the device to an axle body part;
   a receiving region configured to receive the wheel speed sensor; and
   a positioning mechanism configured to controllably set a distance between the receiving region and the pole wheel;
   wherein the positioning mechanism has an interface region, wherein at least one of the wheel speed sensor and the receiving region is arranged at a first end of the interface region, and the interface region has an opening at a second end;
   wherein the interface region comprises a fastening tab; and
   wherein a spindle engages through the opening at the second end of the interface region, wherein the spindle comprises an external thread and/or the opening comprises an internal thread, wherein the internal thread and/or the external thread have/has a pitch between 0.2 mm and 5 mm.

2. The device as claimed in claim 1, wherein the pitch is between 0.5 mm and 2.5 mm.

3. The device as claimed in claim 2, wherein the pitch is between 0.8 mm and 1.5 mm.

4. The device as claimed in claim 1, wherein, for the controlled setting of the distance between the wheel speed sensor and the pole wheel, the interface region is configured to be fixed with respect to the spindle by two fixing arrangements.

5. The device as claimed in claim 4, where the two fixing arrangements comprise two nuts.

6. The device as claimed in claim 4, wherein the fixing arrangements bear against the fastening tab on opposite sides.

7. A device for positioning a wheel speed sensor relative to a pole wheel, comprising:
   a fastening mechanism configured to attach the device to an axle body part;
   a receiving region configured to receive the wheel speed sensor; and
   a positioning mechanism configured to controllably set a distance between the receiving region and the pole wheel; and
   wherein the fastening mechanism is attached to the axle body part so as to be offset by a holder distance from the pole wheel in an axial direction predetermined by the axis of rotation of the axle body part, and wherein the ratio between holder distance and the thickness of the pole wheel measured in the axial direction is between 0.75 and 5.

8. The device as claimed in claim 7, wherein the ratio is between 0.8 and 3.

9. The device as claimed in claim 8, wherein the ratio is between 0.9 and 1.8.

10. An ABS system comprising a device for positioning a wheel speed sensor relative to a pole wheel, comprising:
    a fastening mechanism configured to attach the device to an axle body part;
    a receiving region configured to receive the wheel speed sensor;
    a positioning mechanism configured to controllably set a distance between the receiving region and the pole wheel; and
    an axle body part and a further axle body part which is connected to the pole wheel in a rotationally fixed manner, wherein the further axle body part is mounted so as to be rotatable with respect to the axle body part about an axis of rotation.

* * * * *